United States Patent
Ogino et al.

(10) Patent No.: US 6,993,345 B2
(45) Date of Patent: Jan. 31, 2006

(54) POSITIONING SYSTEM OF WIRELESS TERMINAL

(75) Inventors: Hiroyasu Ogino, Okazaki (JP); Atsushi Hayashida, Kariya (JP)

(73) Assignee: Denso Corporation, Kariya (JP)

(*) Notice: Subject to any disclaimer, the term of this patent is extended or adjusted under 35 U.S.C. 154(b) by 386 days.

(21) Appl. No.: 10/229,224

(22) Filed: Aug. 28, 2002

(65) Prior Publication Data
US 2003/0045305 A1    Mar. 6, 2003

(30) Foreign Application Priority Data
Aug. 30, 2001 (JP) ............................. 2001-261424

(51) Int. Cl.
*H04Q 7/20*    (2006.01)
*H04Q 7/38*    (2006.01)

(52) U.S. Cl. .............................. 455/456.1; 455/456.2; 455/456.3; 455/456.5; 455/456.6; 455/422.1; 342/357.01; 342/357.06; 342/357.07; 342/357.11; 342/357.15; 701/207; 701/213; 701/214

(58) Field of Classification Search ..... 455/456.1–457, 455/2.1, 11.1, 427, 430, 13.2, 422.1, 403, 455/500, 517, 550.1, 428, 429, 426.1, 426.2, 455/404.1, 404.2, 445, 432.1, 432.2; 342/357.01, 342/357.06, 357.07, 357.11, 357.15; 701/1, 701/2, 13, 3, 213, 214, 215, 207
See application file for complete search history.

(56) References Cited

U.S. PATENT DOCUMENTS

| | | | | |
|---|---|---|---|---|
| 5,036,329 A | * | 7/1991 | Ando | 342/357.15 |
| 6,437,734 B1 | * | 8/2002 | McBurney et al. | 342/357.09 |
| 2002/0085627 A1 | * | 7/2002 | Younis | 375/149 |
| 2002/0115448 A1 | * | 8/2002 | Amerga et al. | 455/456 |

FOREIGN PATENT DOCUMENTS

| | | |
|---|---|---|
| JP | A 11-239381 | 8/1999 |
| WO | WO 00/36431 | 6/2000 |

* cited by examiner

Primary Examiner—Keith Ferguson
(74) Attorney, Agent, or Firm—Oliff & Berridge, PLC

(57) ABSTRACT

A wireless terminal has the enhanced performance in the attainability of successful search of GPS satellites based on the operation of a position data server. The server sets a GPS satellite search time longer than usual when station data pertinent to surrounding stations is below a prescribed level, when the distance between the wireless terminal and a communication station is beyond a prescribed distance, when the wireless terminal is in such a specific area as seashore, or when a reference station or the communication station is a repeater station. The server sends data of the longer search time to the wireless terminal via the communication station. Setting a GPS satellite search time longer than usual prevents the deviation of the ideal search timing, which enables the optimal search of GPS satellites, out of the search time set by the position data server.

6 Claims, 10 Drawing Sheets

POSITIONING SYSTEM OF WIRELESS TERMINAL

CROSS REFERENCE TO RELATED APPLICATION

This application is based on Japanese Patent Application No. 2001-261424 filed on Aug. 30, 2001 the contents of which are incorporated herein by reference.

BACKGROUND OF THE INVENTION

1. Field of the Invention

The present invention relates to a positioning system of wireless terminal, and more particularly, a positioning system of a wireless terminal using a satellite positioning system such as the Global Positioning System. The present invention may be directed to the positioning system, a position data server in the system, a wireless terminal in the system, a computer program products for the position data server, and a computer program products for the wireless terminal.

2. Related Art

Terminals having wireless communication functions are called wireless terminals. Mobile phones, mobile terminals and portable computers are among the known wireless terminals. Also known are positioning systems for pointing the location of terminals. For example, there are known positioning systems which use satellites. Specifically, the Global Positioning System is available for use.

These positioning system operates to point the location of a mobile phone based on the satellite signals from GPS satellites when the mobile phone is in such a place as outdoors where it can search for GPS satellites certainly, or based on the signal delay values of the station signals from surrounding stations when the mobile phone is in such a place as the inside of building where it cannot search for GPS satellites certainly.

A mobile phone, if it is designed to point its location by itself, would need to keep almanac data of GPS satellites and almanac data of stations and implement the intricate positioning computation, resulting adversely in a higher cost and higher complexity of the mobile phone. In coping with this situation, there has been devised a system in which each mobile phone does not points its location by itself, but it searches for GPS satellites and stations thereby to fetch GPS satellite data and station data and sends the fetched GPS satellite data and station data to a position data server, and the position data server points the location of the mobile phone based on the GPS satellite data and station data received from the mobile phone.

In this system, in which the position data server points the location of a mobile phone, the mobile phone designates a surrounding station with the smallest signal delay value, for example, to be the reference station from among several surrounding stations near the station in communication linkage with the mobile phone, and sends station data pertinent to the surrounding stations to the position data server.

The position data server receives the station data from the mobile phone, makes reference to the stored almanac data of stations thereby to extract the latitudes and longitudes of the surrounding stations based on the received station data, and computes the pseudo distances from the mobile phone to the surrounding stations based on the signal delay values of the station signals from the surrounding stations relative to the signal delay value of the station signal from the reference station thereby to determine the approximate location of the mobile phone. The position data server sets a search timing and search time which are optimal for the mobile phone to search for GPS satellites, and sends assistant data inclusive of the set-up search timing and search time to the mobile phone.

The mobile phone receives the assistant data from the position data server, extracts the search timing and search time from the received data, searches for GPS satellites based on the extracted search timing and search time thereby to fetch GPS satellite data, and sends the fetched GPS satellite data to the position data server. The position data server receives the GPS satellite data from the mobile phone, points the location of the mobile phone based on the received GPS satellite data, and sends a positioning result indicative of the pointed location of mobile phone to the mobile phone.

At the determination of the approximate location of the mobile phone by the position data server, there arises a position inference error TP which is the difference between the approximate location and the actual location of the mobile phone. The position inference error is large when the number of station data received by the position data server from the mobile phone is small, i.e., station data is below a prescribed level (inadequate). At the transaction of station data and assistant data between the mobile phone and the position data server via the communication station, there arises a propagation delay error TD which is the difference between the timing of transmission of the station signal by the communication station and the timing of reception of the station signal by the mobile phone. The propagation delay error is large when the distance between the mobile phone and the communication station is large.

FIG. 10, FIG. 11 and FIG. 12 show the relation among the position inference error TP, propagation delay error TD, and the search timing TM and search time TS set by the position data server. In these figures, shown by (a) is the timing TT of transmission of the station signal by the communication station, (b) is the timing TR of reception of the station signal by the mobile phone, (c) is the ideal timing TB of search of GPS satellites, (d) is the search timing TM set up by the position data server, (e) is the search time TS set up by the position data server, and (f) is the actual search time TS of the mobile phone and the search timing TMD which is a center value of the search time TS. The figures show a relatively small propagation delay error TDS and a relatively large propagation delay error TDL, and show a relatively small position inference error TPS and a relatively large position inference error TPL.

The position data server sets a GPS satellite search time TS for the mobile phone, which is derived from a certain time range around the center of search timing TM determined based on the inclination angle of GPS satellites and the like. As shown in FIG. 10, in case the propagation delay error TDS and position inference error TPS are relatively small, the ideal GPS satellite search timing TB is within the search time TS of the mobile phone. Accordingly, it is possible for the mobile phone to search for GPS satellites at the ideal GPS satellite search timing TB.

However, as shown in FIG. 11, if the number of station data informed by the mobile phone to the position data server is small, i.e., station data is below a prescribed level, the position inference error TPL increases, causing the ideal search timing TB to be out of the search time TS set by the position data server, and the mobile phone will fail in the search of GPS satellites and thus in the accurate location pointing.

In case the distance between the mobile phone and the communication station is large, the propagation delay error TDL increases, causing also in this case the ideal search timing TB to be out of the search time TS set by the position data server as shown in FIG. 12, and the mobile phone will fail in the search of GPS satellites and thus in the accurate location pointing. The mobile phone will obviously encounter the same situation when both of the position inference error TP and propagation delay error TD increase.

SUMMARY OF THE INVENTION

An object of the present invention is to gain the attainability of successful search of GPS satellites by a wireless terminal.

According to one aspect of this invention, a position data server sets a search time which is longer than usual if a prescribed condition is met, and sends data of the longer search time to the wireless terminal via a communication station. The wireless terminal searches for GPS satellites during the search time informed by the position data server thereby to fetch GPS satellite data, and sends the fetched GPS satellite data to the position data server via the communication station. The position data server points the location of the wireless terminal based on at least the GPS satellite data received from the wireless terminal.

For one example, the position data server sets a search time which is longer than usual for the search of GPS satellites when the position inference error and propagation delay error increase. As a result, it becomes possible to prevent the deviation of the ideal search timing, which enables the optimal search of GPS satellites, out of the search time set by the position data server. In consequence, it becomes possible to gain the attainability of successful search of GPS satellites by the wireless terminal and the attainability of accurate location pointing of the wireless terminal.

For another example, the position data server sets a search time which is longer than usual for the search of GPS satellites when station data pertinent to surrounding stations is below a prescribed level, when the distance between the wireless terminal and the communication station is beyond a prescribed distance, when the wireless terminal is in such a specific area as seashore, or when the reference station or communication station is a repeater station, and sends data of the longer search time to the wireless terminal via the communication station.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DESCRIPTION OF THE PREFERRED EMBODIMENT

An embodiment of the inventive wireless terminal which is applied to a mobile phone will be explained with reference to FIG. 1 through FIG. 9.

Figure 1:
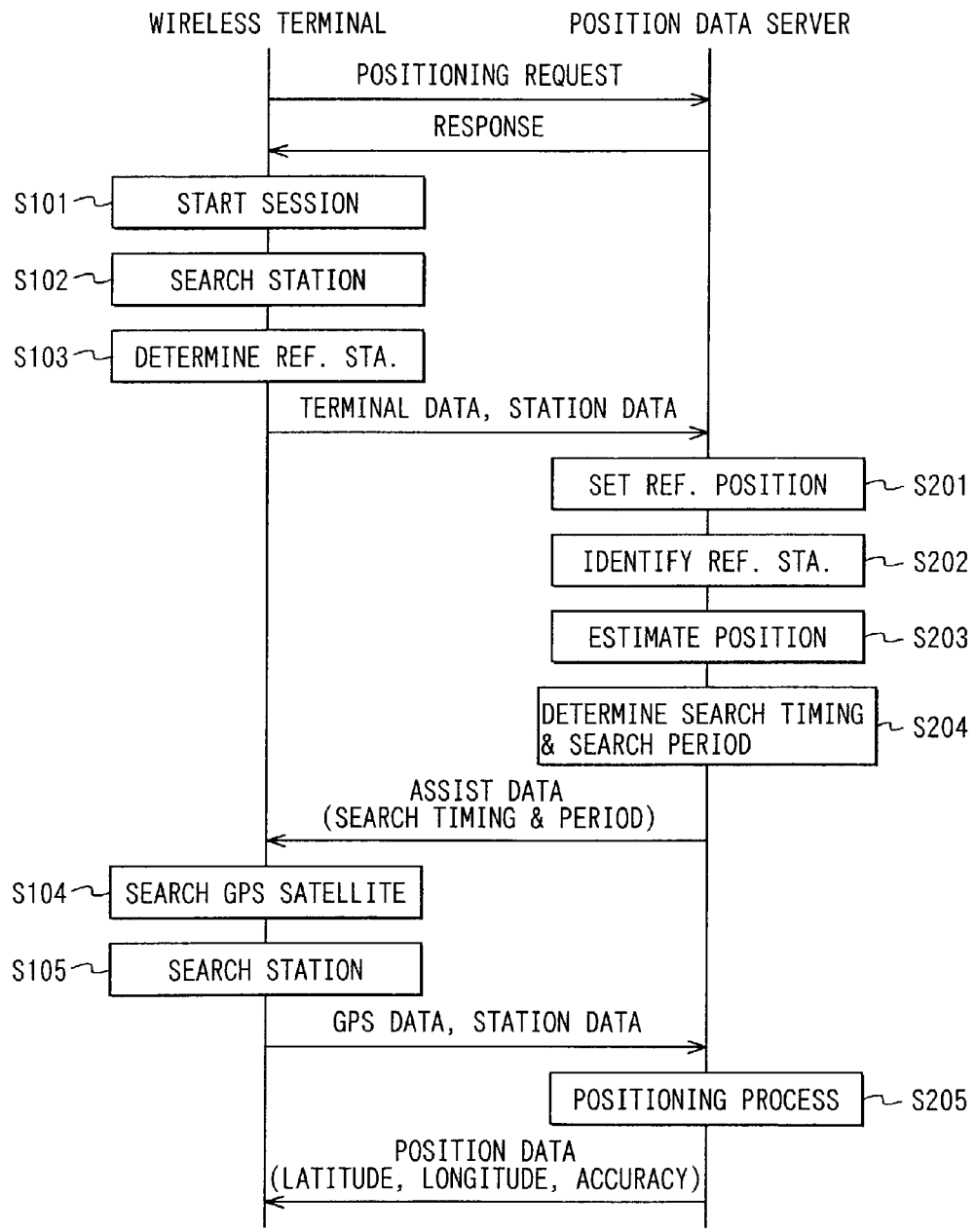
FIG. 1 is a flowchart showing the positioning operation according to a first embodiment of the present invention.
Figure 2:
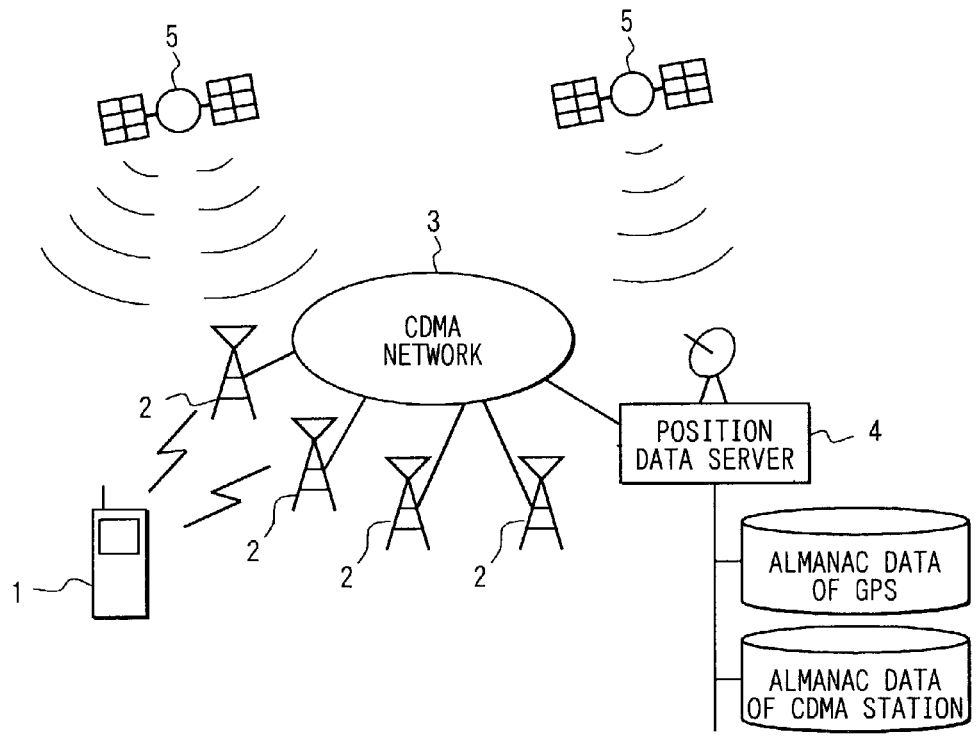
FIG. 2 is a block diagram showing the positioning system for a wireless terminal according to the first embodiment of the present invention.

FIG. 2 shows briefly the organization of the positioning system. A mobile phone 1 selects a communication station from among multiple stations 2 based on the electric field strength of the received station signals for example, and transacts various data with a position data server 4 via the selected communication station and a CDMA (Code Division Multiple Access) network 3. The mobile phone 1 and position data server 4 receive GPS satellite signals from GPS (Global Positioning System) satellites 5. The position data server 4 has a record of almanac data pertinent to GPS satellites 5 and almanac data pertinent to stations (installation location, antenna directivity, service area, etc.).

Figure 3:
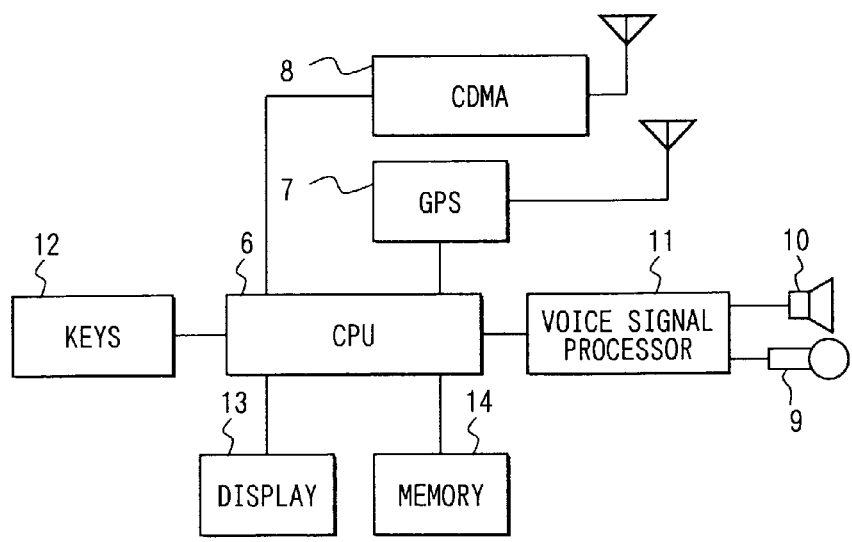
FIG. 3 is a block diagram of the wireless terminal according to the first embodiment of the present invention.

FIG. 3 shows by block diagram briefly the functional components of the mobile phone 1. The mobile phone 1 includes a CPU (Central Processing Unit) 6 as major component of a microcomputer, which is connected with a GPS transceiver 7 which is used to search for GPS satellites 5, a CDMA transceiver 8 which is used to search for stations 2 and transact data with the position data server 4 via the CDMA network 3, a voice signal processor 11 which deals with a voice signal entered by a microphone 9 and a voice signal to be released by a speaker 10, a key panel 12 which includes a talk start key, talk end key and numeric keys, a liquid crystal display panel 13 which displays the date and time and telephone number, and a memory 14 which includes RAM (Random Access Memory) and ROM (Read Only Memory). The key panel 12 may be a touch-panel in combination with the display panel 13, and the GPS transceiver 7 and CDMA transceiver 8 may share an antenna.

Next, the system operation will be explained with reference to FIG. 1 and FIG. 4 through FIG. 9. The mobile phone 1 is instructed by the user or the CDMA network 3 to commence the positioning operation, and it sends a request signal of the commencement of location pointing to the position data server 4. The position data server 4 receives the positioning request from the mobile phone 1, determines as to whether or not location pointing is possible, and, if possible, it sends a request acknowledge signal to the mobile phone 1.

The mobile phone 1 receives the request acknowledge signal from the position data server 4, starts the positioning session:(step S101), searches for surrounding stations around the communication station:(step S102), and designates a station with the smallest signal delay value, for example, among the surrounding stations to be the reference station:(step S103). The mobile phone 1 sends its terminal data (telephone number, etc.) and station data of the surrounding stations to the position data server 4.

The position data server 4 receives the terminal data and station data from the mobile phone. The position data server 4 sets a positioning reference point based on the received station data:(step S201), and identifies the reference station: (step S202). The position data server 4 makes reference to the almanac data of the stations 2 thereby to extract the latitudes and longitudes of the surrounding stations based on the received station data. The position data server 4 computes the pseudo distances from the mobile phone 1 to the surrounding stations based on the signal delay values of the station signals from the surrounding stations relative to the signal delay value of the station signal from the reference station. The position data server 4 determines the approximate location of the mobile phone 1 based on the location data and pseudo distances of the stations:(step S203). The position data server 4 sets a search timing and search time for the mobile phone 1 to search for GPS satellites:(step S204).

Figure 4:
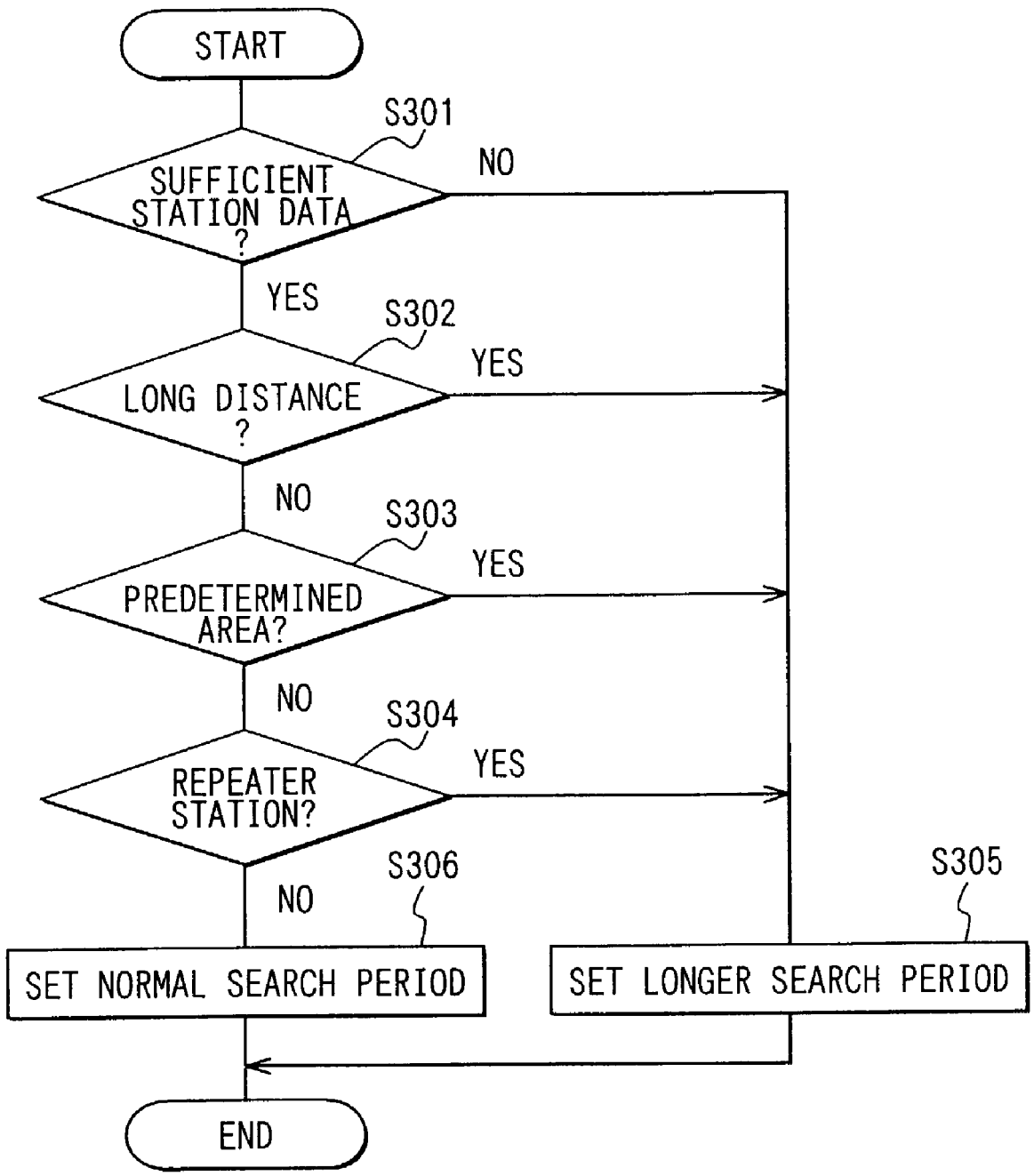
FIG. 4 is a flowchart showing the process implemented by the position data server according to the first embodiment of the present invention.

The position data server 4 sets the search time based on the process shown by the flowchart of FIG. 4. Specifically, the position data server 4 determines as to whether or not the station data reaches a prescribed level (adequate):(step S301), determines as to whether or not the pseudo distance between the mobile phone 1 and the communication station exceeds a prescribed distance:(step S302), determines as to whether or not the mobile phone 1 is in such a specific area as seashore:(step S303), and determines as to whether or not the reference station or communication station is a repeater station:(step S304).

Upon determining that, for example, the number of station data received from the mobile phone 1 is small, i.e., station data is below a prescribed level (inadequate):(no in step S301), the position data server 4 sets a search time which is longer than usual:(step S305). Namely, when the station data does not reach the prescribed level, the position data server 4 assumes a large position inference error which will emerge in the approximate location of the mobile phone 1, and therefore sets a search time longer than usual. The prescribed level may be set automatically on optimum basis by the position data server 4 based on logged data, or may be set by the user.

When the position data server 4 determines that the distance between the mobile phone 1 and the communication station exceeds the prescribed distance, which is assessed from a large signal delay value of the station signal received by the mobile phone 1 from the communication station: (yes in step S302), the position data server 4 sets also in this case a search time which is longer than usual:(step S305). Namely, when the signal propagation delay error is large, the position data server 4 assumes an excessive distance between the mobile phone 1 and the communication station, and sets a search time longer than usual. The prescribed distance may be set automatically on optimum basis by the position data server 4 based on logged data, or may be set by the user, as in the case of the prescribed level.

Figure 5:
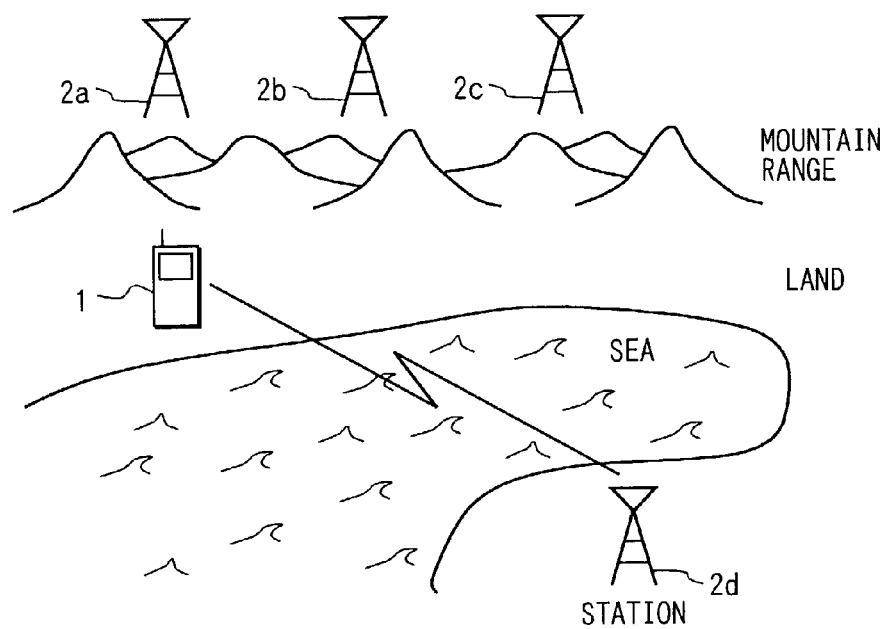
FIG. 5 and FIG. 6 are diagrams showing examples of the use of the positioning system according to the first embodiment of the present invention.

The position data server 4 makes reference to the almanac data of the communication station, and upon determining that the communication station is in such a specific area as seashore and accordingly the mobile phone 1 is also in such area:(yes in step S303), sets also in this case a search time which is longer than usual:(step S305). Namely, when the mobile phone 1 is in such a specific area as seashore, in which case the mobile phone 1 probably designates a station 2d that is in sight, even though it is far from the mobile phone 1, to be the communication station, instead of designating stations 2a–2c of low visibility as shown in FIG. 5, and in which case the propagation delay error is probably large, the position data server 4 sets a search time which is longer than usual.

Figure 6:
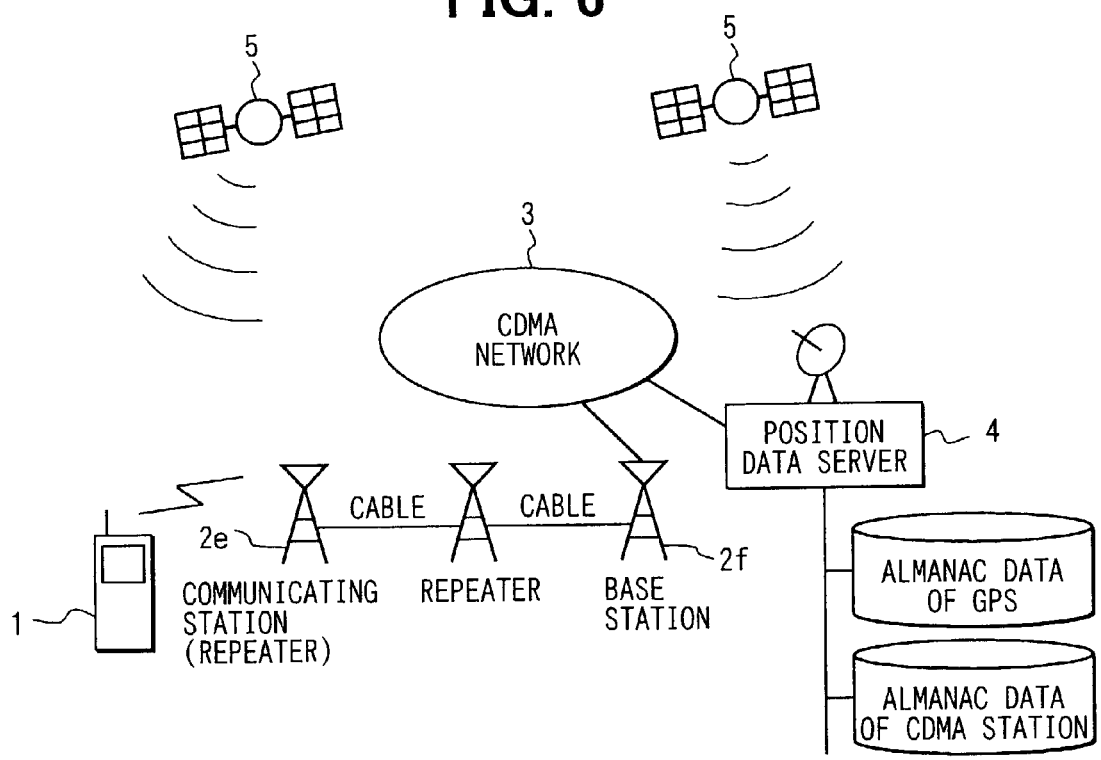

The position data server 4 further makes reference to the almanac data of the reference station and communication station, and upon determining that the reference station or communication station is a repeater station:(yes in step S304), sets also in this case a search time which is longer than usual:(step S305). Namely, when the communication station 2e or reference station is a repeater station as shown in FIG. 6, in which case there emerges a signal propagation delay in proportion to the cable length between the base station 2f and the repeater station 2e and a signal delay caused by signal conversion, the position data server 4 assumes a large position inference error and propagation delay error, and sets a search time which is longer than usual.

In these cases, the degree of extension of the search time may be determined based on the positions of GPS satellites 5, the number data of surrounding stations and the distance between the mobile phone 1 and the communication station, or may be determined with respect to the usual search time.

Otherwise, when the position data server 4 makes negative determination in these steps, it sets the usual search time:(step S306).

The position data server 4 sends assistant data including the set-up search timing and search time to the mobile phone 1.

The mobile phone 1 receives the assistant data from the position data server 4, extracts the search timing and search time from the received assistant data, and searches for GPS satellites 5 based on the extracted search timing and search time:(step S104).

Figure 7:
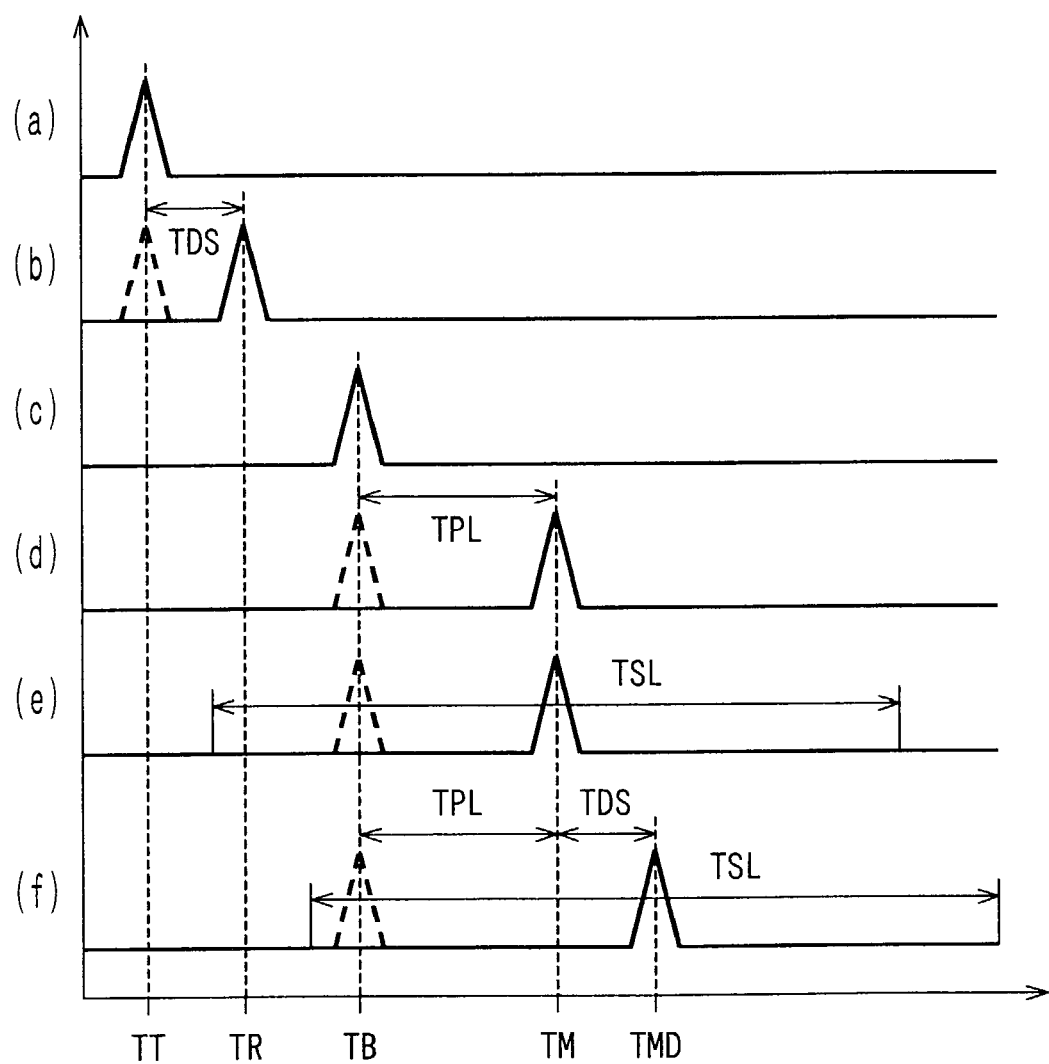
FIG. 7 is a timing chart showing the processes of the positioning system according to the first embodiment of the present invention.
Figure 8:
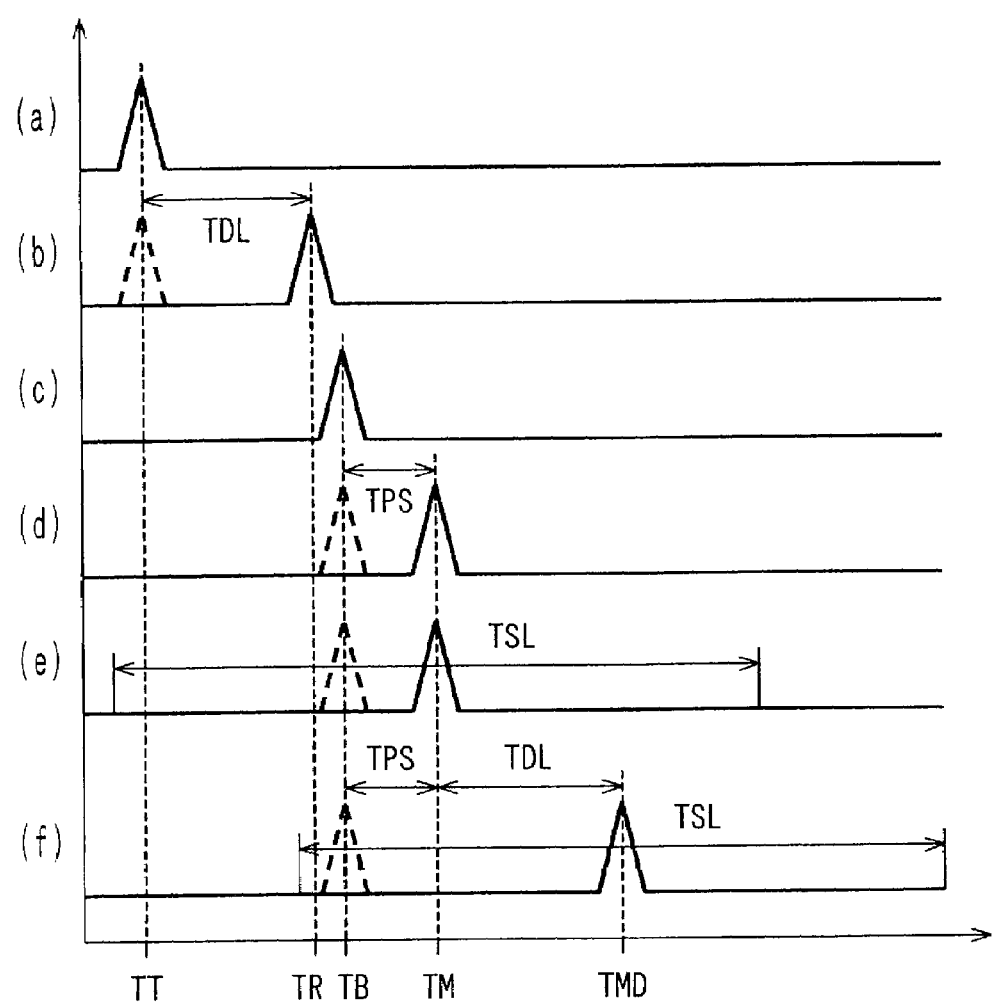
FIG. 8 is a timing chart showing the processes of the positioning system according to the first embodiment of the present invention.
Figure 10:
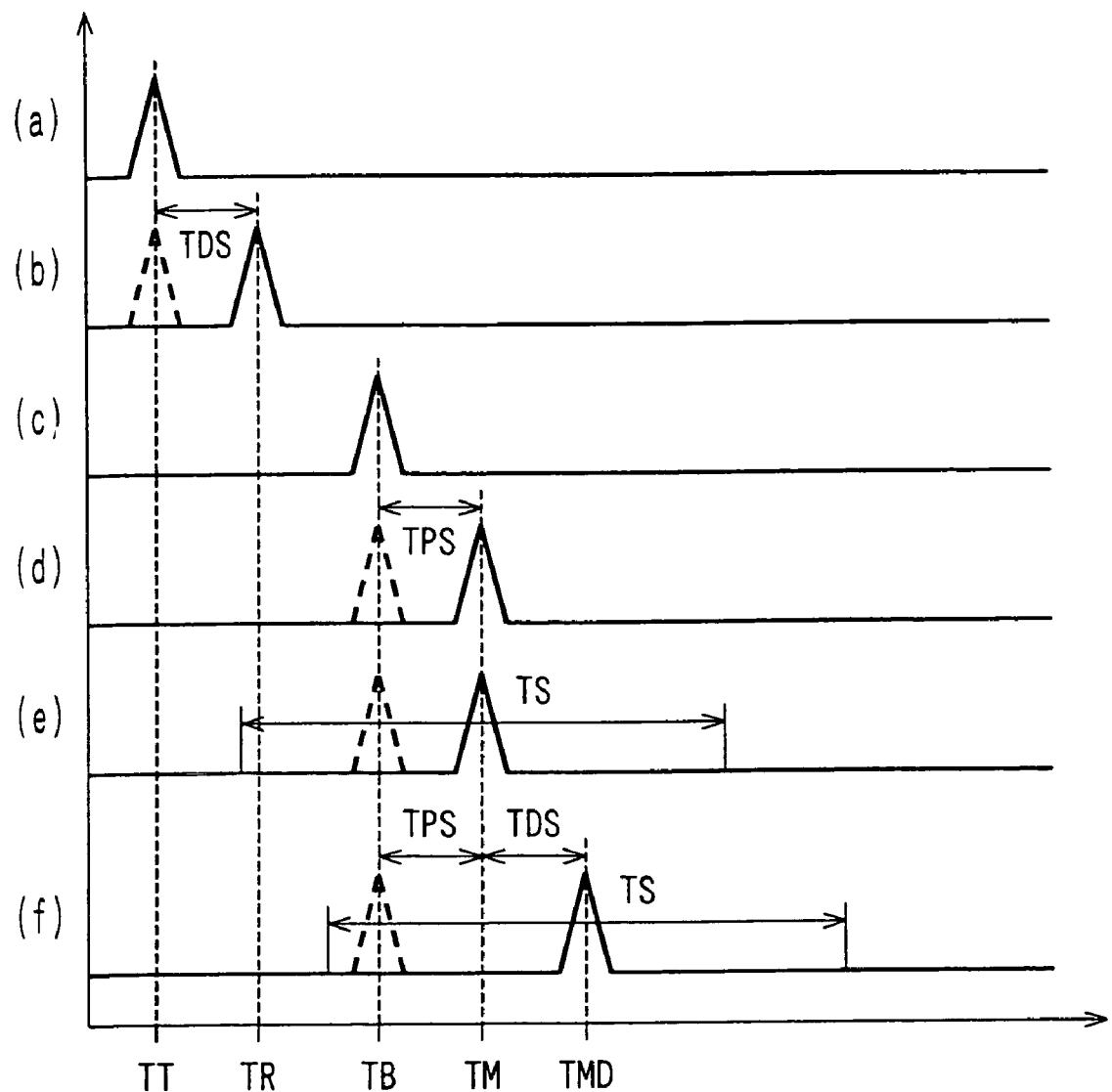
FIG. 10 is a timing chart showing the process of the conventional positioning system.
Figure 11:
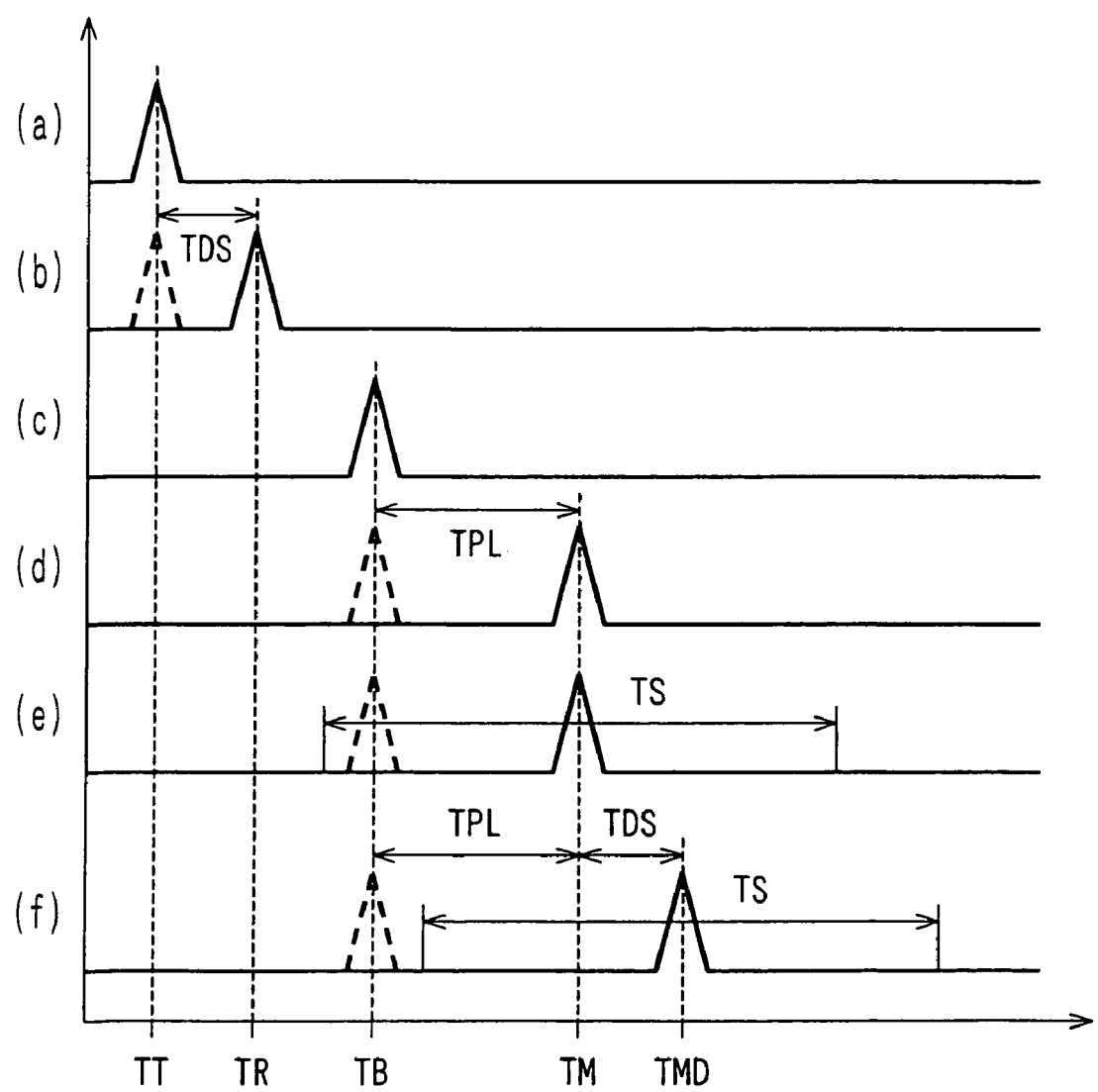
FIG. 11 is a timing chart showing the process of the conventional positioning system.
Figure 12:
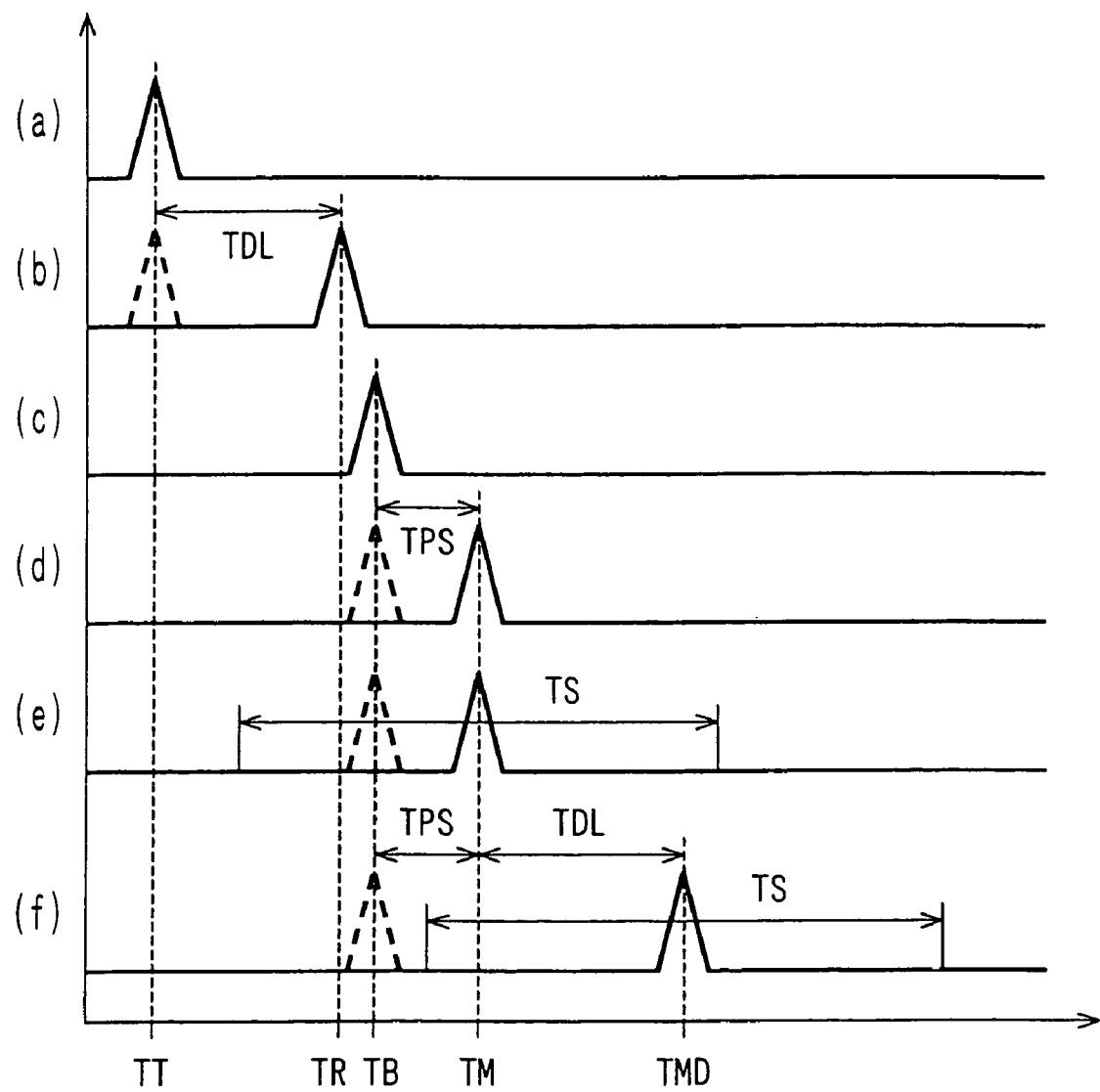
FIG. 12 is a timing chart showing the process of the conventional positioning system.

FIG. 7 and FIG. 8 are timing charts showing the processes based on this embodiment. The figures are derived from FIG. 10 through FIG. 12, with the usual search time TS being replaced with a longer search time TSL. As shown in FIG. 7, the position data server 4 sets a search time TSL which is longer than the usual value TS when the position inference error is large. In consequence, the ideal GPS satellite search timing TB is not out of the search time TSL set by the position data server 4. Namely, it becomes possible to search for GPS satellites 5 at the ideal GPS satellite search timing TB.

As shown in FIG. 8, the position data server 4 sets a search time TSL which is longer than usual when the propagation delay error TDL is large. In consequence, the ideal GPS satellite search timing TB is not out of the search time TSL set by the position data server 4. Namely, it becomes possible to search for GPS satellites 5 at the ideal GPS satellite search timing TB.

The mobile phone 1 searches for surrounding stations again:(step S105), and sends GPS satellite data pertinent to the GPS satellites 5 and station data pertinent to the surrounding stations to the position data server 4. The position data server 4 receives the GPS satellite data and station data from the mobile phone 1, computes the mobile phone location based on the received GPS satellite data and station data:(step S205), and sends the positioning result to the mobile phone 1. The mobile phone 1 receives the positioning result from the position data server 4, and displays the received positioning result on the display panel 13.

Figure 9:
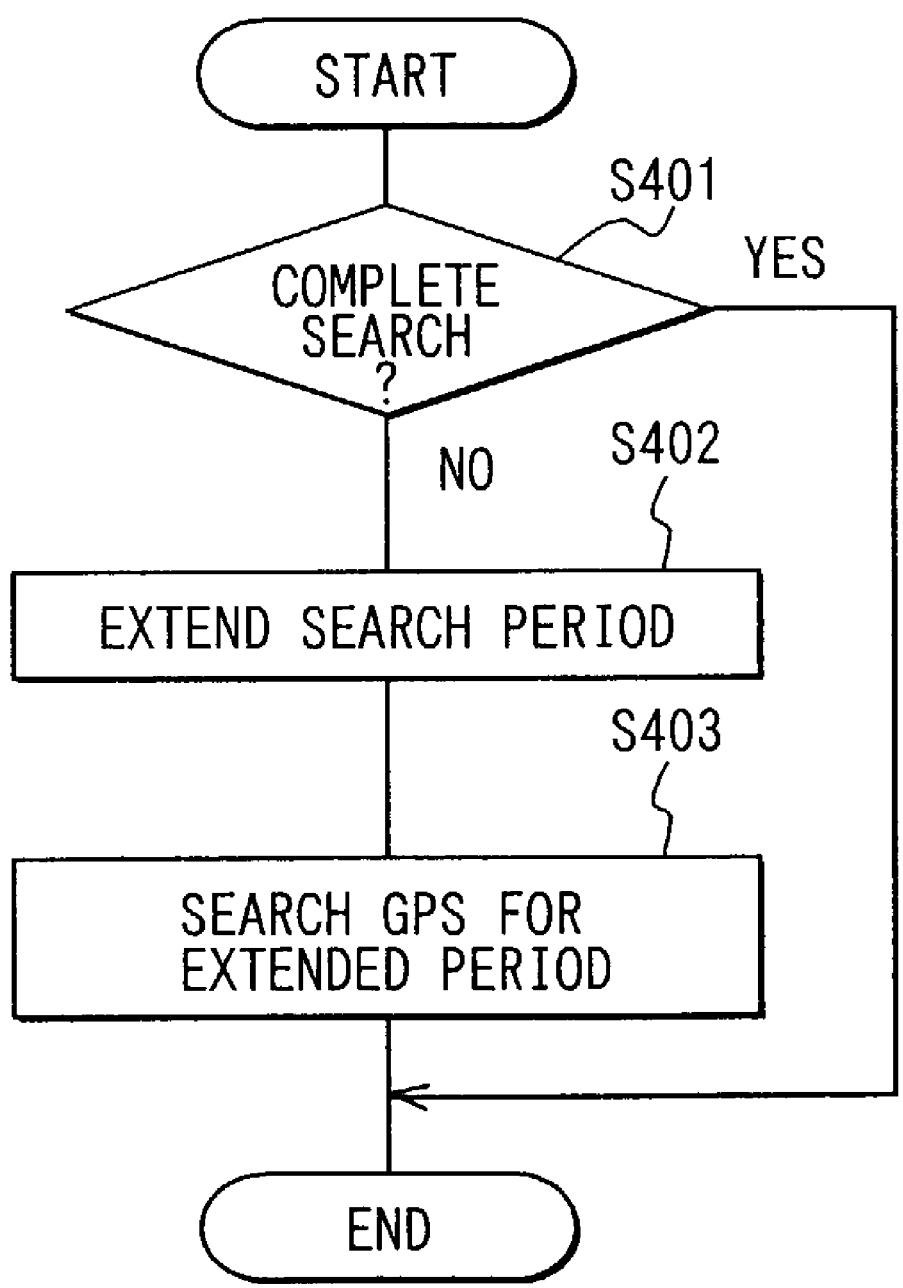
FIG. 9 is a flowchart showing the operation of the wireless terminal according to the first embodiment of the present invention.

In contrast to the foregoing embodiment in which the mobile phone 1 searches for GPS satellites 5 during a search time which is set longer than usual by the position data server 4, an alternative system design is such that if the mobile phone 1 fails to search for GPS satellites 5, it sets a new search time which is longer than the search time instructed by the position data server 4 and searches for GPS satellites 5 during the new search time. Specifically, as shown in FIG. 9, the mobile phone 1 searches for GPS satellites 5 during the search time instructed by the position data server 4, and thereafter determines as to whether or not the search of GPS satellites 5 is successful:(step S401). If the mobile phone 1 fails to search for GPS satellites 5:(no in step S401), it sets a new search time which is longer than the search time instructed by the position data server 4:(step S402), and searches for GPS satellites 5 during the new search time:(step S403).

Based on this system design, even if the mobile phone 1 fails to search for GPS satellites 5 due to a large position inference error or propagation delay error following the search of GPS satellites 5 throughout the search time instructed by the position data server 4, it is possible for the mobile phone 1 to set a new search time which is longer than the search time instructed by the position data server 4 and searches for GPS satellites 5 at the ideal search timing.

It is also possible to validate or invalidate the above-mentioned process depending on the configuration of GPS satellites 5. It is further possible for the mobile phone 1 to search for GPS satellites 5, determine the success of search, and extend the search time in steps cyclically until it searches for GPS satellites 5 successfully. It is also possible to set an upper limit of the search time or an upper limit of the number times of searching of GPS satellites 5.

According to the foregoing embodiment as described above, the position data server 4 sets a search time which is longer than usual for the search of GPS satellites by the mobile phone 1 when station data pertinent to surrounding stations is below a prescribed level, when the distance between the wireless terminal 1 and the communication station is beyond a prescribed distance, when the wireless terminal 1 is in such a specific area as seashore, or when the reference station or communication station is a repeater station, and sends data of the longer search time to the wireless terminal 1 via the communication station.

For dealing with these cases where the position inference error or propagation delay error is probably large, it becomes possible, by setting a GPS satellite search time longer than usual, to prevent the deviation of the ideal search timing, which enables the optimal search of GPS satellites, out of the search time set by the position data server 4, and consequently it becomes possible to gain the attainability of successful search of GPS satellites by the wireless terminal 1 and the attainability of accurate location pointing of the wireless terminal 1.

Based on this system design, even if the mobile phone 1 fails to search for GPS satellites 5, it is possible for the mobile phone 1 to set a new search time which is longer than the search time instructed by the position data server 4 and searches for GPS satellites 5 during the new search time, and consequently it becomes possible also in this case to gain the attainability of successful search of GPS satellites by the wireless terminal 1 and the attainability of accurate location pointing of the wireless terminal 1.

The present invention is not confined to the foregoing embodiment, but the alteration or expansion is possible as follows. The wireless terminal can be other communication terminal such as a mobile terminal, besides the mobile phone. A station may be designed to have the function of position data server. The propagation delay error may be computed in terms of a time length since the communication station sends a station signal to the mobile phone until it receives a response signal from the mobile phone. Specific areas for mobile phones may include generally places where distant stations rather than nearby stations are presumably in sight, besides seashores. The computer program which is run by the CPU of mobile phone may be down-loaded from a certain server via a network or may be transferred from a CD-ROM (Compact Disk Read Only Memory) or magnetic card and installed, besides the provision in a memory at the time of manufacturing.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A positioning system, comprising:
    a position data server which sends data of a search time for the search of GPS satellites to a wireless terminal via a communication station and points the location of the wireless terminal based on at least GPS satellite data received from the wireless terminal; and
    the wireless terminal which searches for GPS satellites during the search time received in data from the position data server, and sends the fetched GPS satellite data to the position data server via the communication station, wherein
    the position data server setting a search time which is longer than usual if a prescribed condition is met and sending data of the longer search time to the wireless terminal via the communication station; and
    the prescribed condition, based on which the position data server sets a longer search time, is derived from at least one of determining that station data pertinent to surrounding communication stations is below a prescribed level, determining that the distance between the wireless terminal and the communication station is beyond a prescribed distance, and determining that the wireless terminal is in a specific area.

2. A positioning system according to claim 1, wherein the position data server assesses the distance between the wireless terminal and the communication station in terms of a pseudo distance which is evaluated based on the delay value of the signal from the communication station.

3. A positioning system according to claim 1, wherein the wireless terminal includes means of extending the search time in response to the failure of search of GPS satellites.

4. A positioning system according to claim 3, wherein the wireless terminal further includes means of setting an upper limit of the GPS satellite searching process.

5. A position data server which sends data of a GPS satellite search time via a communication station to a wireless terminal, which searches for GPS satellites during the search time thereby to fetch GPS satellite data and sends the fetched GPS satellite data to the position data server via the communication station, and points the location of the wireless terminal based on the GPS satellite data received from the wireless terminal, the position data server setting a search time which is longer than usual if a prescribed condition is met and sending data of the longer search time to the wireless terminal via the communication station;

wherein the prescribed condition, based on which the position data server sets a longer search time, is derived from at least one of determining that station data pertinent to surrounding stations is below a prescribed level, determining that the distance between the wireless terminal and the communication station is beyond a prescribed distance, and determining that the wireless terminal is in a specific area.

6. A computer program product for a position data server, the program product comprising:
   a computer readable program code means for determining whether or not station data pertinent to surrounding stations reaches a prescribed level, whether or not the distance between a wireless terminal and a communication station is beyond a prescribed distance, whether or not the wireless terminal is in such a specific, and whether or not a reference station or the communication station is a repeater station;
   a computer readable program code means for setting a search time which is longer than usual in response to determining that the station data of surrounding stations is below the prescribed level, determining that the distance between the wireless terminal and the communication station is beyond the prescribed distance, determining that the wireless terminal is in such a specific area, or determining that the reference station or the communication station is a repeater station; and
   a computer readable program code means for sending data of the longer search time to the wireless terminal via the communication station.

* * * * *